(No Model.)
W. HAWKER.
ELECTRIC CURRENT REGULATOR.
No. 575,235. Patented Jan. 12, 1897.
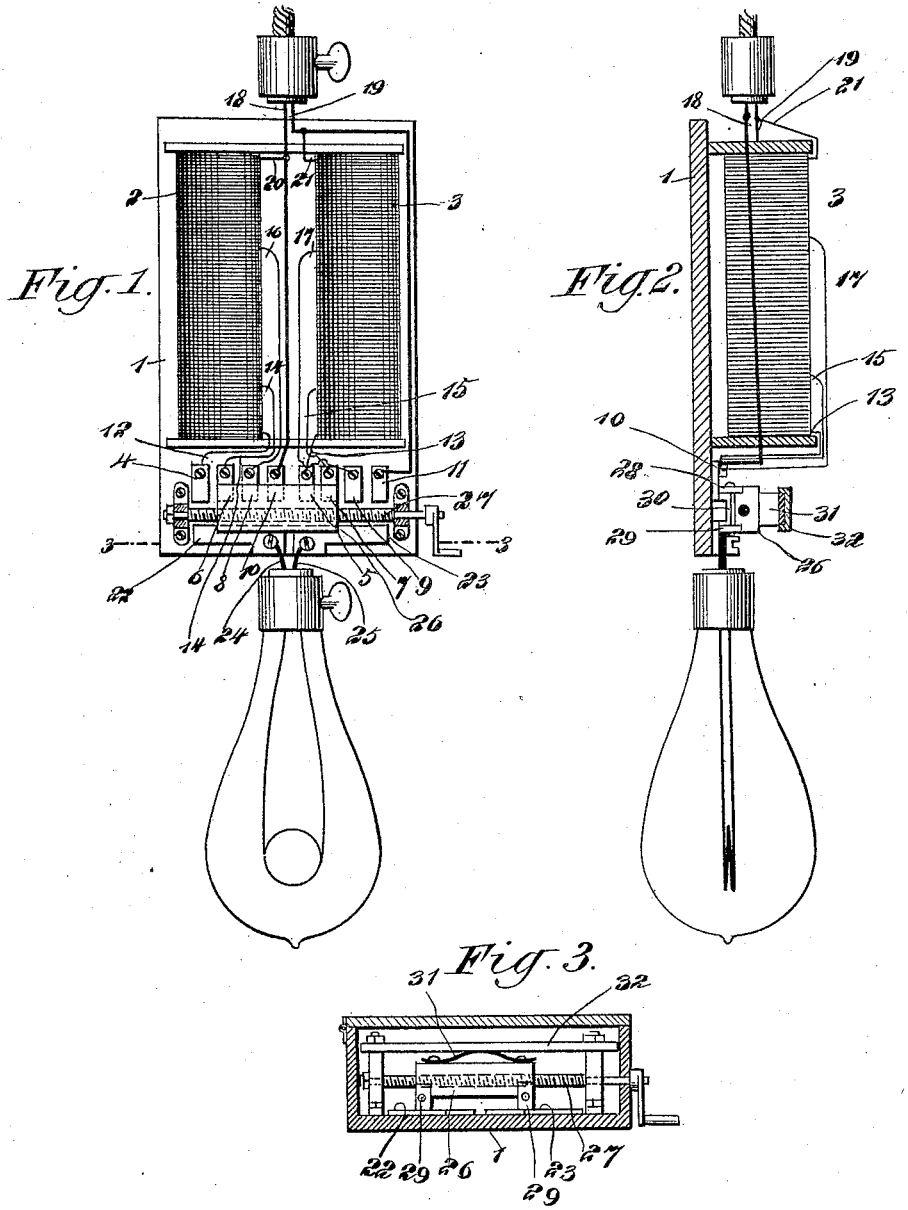
WITNESSES:
INVENTOR
W. Hawker.
BY Munn & Co
ATTORNEYS.

UNITED STATES PATENT OFFICE.

WILLIAM HAWKER, OF WINDSOR MILLS, CANADA.

ELECTRIC-CURRENT REGULATOR.

SPECIFICATION forming part of Letters Patent No. 575,235, dated January 12, 1897.

Application filed September 25, 1896. Serial No. 606,937. (No model.)

*To all whom it may concern:*

Be it known that I, WILLIAM HAWKER, of Windsor Mills, in the Province of Quebec and Dominion of Canada, have invented a new and Improved Electric-Current Regulator, of which the following is a full, clear, and exact description.

This invention relates to devices whereby an electric current may be regulated as to its intensity, and, while it is well adapted for use in connection with many devices, such, for instance, as with motors or generators, I have designed it more particularly for use with incandescent electric lamps, and by means of which the light may be made more or less intense, thus making the device of value in a sick room or hospital or in other places where it may be desired to turn down the light, the same as may be done with a gas-light, without entirely extinguishing the same.

I will describe a regulator embodying my invention, and then point out the novel features in the appended claim.

Reference is to be had to the accompanying drawings, forming a part of this specification, in which similar characters of reference indicate corresponding parts in all the views.

Figure 1 is a front elevation of a regulator embodying my invention. Fig. 2 is a central vertical section thereof, and Fig. 3 is a section on the line 3 3 of Fig. 1.

The invention comprises a base-plate 1, upon which is supported a pair of resistance-coils 2 3. Arranged upon the base-plate 1 is a series of contact-plates arranged in pairs, the plates of a pair being connected, respectively, to the resistance-coils 2 and 3. I have here shown pairs of plates 4 5, pairs of plates 6 and 7, pairs of plates 8 and 9, and pairs of plates 10 and 11. A shunt 12 extends from the plate 4 to a connection with the end of the coil 2, and a shunt 13 extends from the plate 5 to a connection with the end of the coil 3. From the plate 6 a shunt 14 leads to the coil 2 and is tapped into the same at a point higher than the shunt 12, and from a point directly opposite a shunt 15 extends from the coil 3 to a connection with the plate 7. From the plate 8 a shunt 16 leads to a connection with, or is tapped into, the coil 2 at a point above the shunt 14, and from a point of the coil 3 directly opposite the connection of the shunt 16 with the coil 2, a shunt 17 extends to a connection with the plate 9. The plates 10 and 11 are connected, respectively, to the lead-wires 18 and 19. From the lead-wire 18 a shunt-wire 20 leads into the upper end of the resistance-coil 2, and from the lead-wire 19 a shunt-wire 21 leads into the upper end of the resistance-coil 3. On the base 1 are secured two main contact-plates 22 23, with which the lamp-wires 24 25 connect.

As a means for closing the circuit between pairs of plates having connection with resistance-coils and the plates 22 23 I employ a block 26, of insulating material, provided with a longitudinally-screw-threaded hole in which a screw-shaft 27 engages. The said screw-shaft has journal-bearings in suitable lugs fastened to the base 1, and is provided on one of its ends with a crank. This block 26, of insulating material, is provided at its ends with metal plates 28 and 29, the plates 28 and 29 being electrically connected, as here shown, by a strip of metal 30. The contact-block 26 may be provided with a suitable retarding device. As here shown, the retarding device consists of a spring 31, secured to the upper side of the block and adapted to bear against a bar 32, supported by the base 1.

It will be seen that by connecting the several plates to the resistance-coils at different points a varying resistance is assured. In operation, should a full light be desired, the block 26 will be moved to engage the plates 28 29 at one end of said block with the plates 10 and 22 and the plates 28 29 at the opposite end of said block with the plates 11 and 23. Therefore it will be seen that the current will be taken directly from the main or lead wire. When the block 26 is moved to connect the plates 8 and 9 with the plates 22 23, it is obvious that the current will enter the coils 2 and 3 through the shunts 20 and 21 and will flow out through the shunts 16 and 17. Therefore this increased resistance will decrease the intensity of the light. When a contact is made from the plates 4 and 5 to the plates 22 and 23, it is obvious that the intensity of the light will be very low, as the current is flowing through the whole extent of the resistance-coils 2 and 3.

The whole device may be inclosed in a suitable casing of insulating material, as indicated in Fig. 3. I have here shown the device as in connection with one incandescent lamp; but it is obvious that it may be made of any suitable size to operate in connection with a series of lamps or with other devices.

Having thus described my invention, I claim as new and desire to secure by Letters Patent—

An electric-current regulator, comprising a pair of resistance-coils, lead-wires having shunt connections with one end of said coils, a pair of contact-plates with which the lead-wires connect, pairs of contact-plates having shunt-wire connections with the coils at different points of their length, a pair of contact-plates common to all the other pairs of contact-plates and adapted for connection with a lamp or other device, a block carrying contacts for connecting the last-named contact-plates with either single pair of the first-named contact-plates, and a screw-shaft for moving said block, substantially as specified.

WILLIAM HAWKER.

Witnesses:
CHARLES MCKETTRICK,
ARTHUR HOMER ANSELL.